United States Patent [19]

Cannady, Jr.

[11] Patent Number: 4,540,624

[45] Date of Patent: Sep. 10, 1985

[54] ANTISTATIC LAMINATES CONTAINING LONG CARBON FIBERS

[75] Inventor: Daniel L. Cannady, Jr., Allendale, S.C.

[73] Assignee: Westinghouse Electric Corp., Pittsburgh, Pa.

[21] Appl. No.: 597,875

[22] Filed: Apr. 9, 1984

[51] Int. Cl.³ .............................................. D04H 1/16
[52] U.S. Cl. .................................... 428/282; 428/280; 428/284; 428/285; 428/297; 428/298; 428/408; 428/511; 428/537.5; 252/511
[58] Field of Search ............... 428/284, 298, 367, 408, 428/280, 282, 922, 537, 511, 285, 297

[56] References Cited

U.S. PATENT DOCUMENTS

| | | | |
|---|---|---|---|
| 2,351,022 | 6/1944 | Donelson et al. | 106/106 |
| 3,040,210 | 6/1962 | Charlton et al. | 428/408 |
| 3,844,877 | 10/1974 | Wessendorf et al. | 428/282 |
| 4,061,823 | 12/1977 | McCuskey et al. | 428/282 |
| 4,301,040 | 11/1981 | Berbeco | 252/511 |

*Primary Examiner*—James J. Bell
*Attorney, Agent, or Firm*—Daniel P. Cillo

[57] ABSTRACT

A static-dissipating laminate is made, containing at least a bottom core layer and a top decorative layer, both layers being impregnated with a resin, where at least the decorative layer has contacting, long carbon fibers uniformly distributed through it in an amount effective to provide an antistatic effect to the laminate, so that static charges accumulating on the top of the decorative layer are dissipated.

8 Claims, 2 Drawing Figures

ANTISTATIC LAMINATES CONTAINING LONG CARBON FIBERS

BACKGROUND OF THE INVENTION

It is well known that if two surfaces of insulating materials are rubbed together and then separated, an electrostatic charge will build up between the two surfaces. In recent years, this problem in computer room flooring and desk areas has been troublesome, since the discharge of built-up static can result in tape or disc erasures and interference with sensitive equipment. Such charged surfaces in hospital surgical, and other areas where certain anesthetic gases can form violently explosive mixtures with air, has caused even greater concern that the chances of explosions caused by sparks or electrical discharges be minimized. In all of these cases, the static build-up can be caused by walking on flooring, moving electronic components or other equipment from place to place, and even utilizing the keyboard on a computer terminal. Such static build-up can also occur over a period of time in the wearing apparel of workers.

The need for spark-proof flooring was recognized many years ago by Donelson et al., in U.S. Pat. No. 2,351,022. There, calcined magnesite, MgO, was mixed with from about 40 wt. % to 60 wt. % of finely divided coke particles, having from ⅛ inch screen size to fine dust, and liquid magnesium chloride, to provide a spreadable floor composition which could be troweled over a concrete, steel, or wood sub-floor. Such flooring was not very resilient, however, and caused fatigue to those who had to stand or walk on it all day.

More recently, Charlton et al., in U.S. Pat. No. 3,040,210, taught a much more resilient, decorative, carbon containing, linoleum floor sheeting, laminated to a conductive base. The linoleum surface sheeting contains from 1 wt. % to 14 wt. % conductive carbon, homogeneously mixed with other conductive materials, linoleum binder, which contains oxidized drying oils such as linseed oil with up to 35 wt. % resin such as rosin ester gum or phenol-formaldehyde, and sufficient coloring pigments to provide an attractive appearance. The conductive backing must contain from 10 wt. % to 35 wt. % conductive carbon, and can be bonded to fabric for added strength, where the fabric itself can be made conductive by initially dipping it in a dispersion of conductive carbon. This provides a static resistant flooring having a controlled electrical resistance, which will wear evenly, can be applied in long sections minimizing seams, and which is resilient enough to help reduce fatigue for people that must stand or walk on the flooring for long periods of time.

Berbeco, in U.S. Pat. No. 4,301,040, taught static-free mats containing a standard, non-conductive decorative laminate, such as a 0.16 cm. (1/16 in.) thick melamine-formaldehyde laminate, or a rubber, nylon, polycarbonate, polyethylene or polypropylene, non-conductive sheet, as a top surface, adhesive bonded to, or coated with, either an electrically conductive solid or an open cell foam bottom backing layer. The bottom layer includes a polymeric material or a foam and an antistatic amount, generally about 2 wt. % to 40 wt. % of conductive particulate material, such as metal particles, aluminum salts such as aluminum silicate, graphite fibers, and preferably carbon black particles. Useful polymeric materials include butadiene-styrene resin and the like, and useful foams include polyurethane foams, polyester foams and the like. When a foam is used as the bottom layer, a flexible cushion mat results.

Standard decorative laminates are non-conductive through their cross-section, and are described, for example, by McCaskey, Jr. et al., in U.S. Pat. No. 4,061,823. They are popular as surfacing material for counter and furniture tops. Because, in many cases, they must be machined, fillers other than coloring pigments are usually avoided. Such laminates generally contain 2 to 6 fibrous, Kraft paper sheets, impreganted with phenol-aldehyde resin, as a core for 1 high quality, fibrous, alpha-cellulose decorative print sheet, having a pattern or plain color, impregnated with melamine-aldehyde resin, and 1 top, high quality, fibrous, alpha-cellulose overlay protective sheet, also impregnated with melamine-aldehyde resin. Any pigmentation fillers would only be present in the decorative print sheet.

The Donelson et al. composition is applicable to dense flooring and requires large amounts of carbon material. The Charlton et al. material also requires the use of large amounts of relatively expensive carbon, and requires a complicated manufacturing process. The Berbeco material requires a non-conductive surface, through which the backing would have to draw static charges. Of course, standard decorative laminates are usually non-conductive. What is needed is a surfacing material useful for flooring and desk or counter tops, having outstanding antistatic properties, good wear properties, and an attractive appearance, and which is also inexpensive, easy to manufacture, and thin enough to allow ease of installation.

SUMMARY OF THE INVENTION

The above needs have been met, and the above problems solved, by providing a static-dissipating, high pressure decorative laminate, having print and preferably core sheets containing an antistatic effective amount, from about 1 wt. % to about 15 wt. %, of long, conductive carbon fibers, uniformly distributed in an intermingled, interconnecting, contacting relationship throughout the sheets. Paper made with thin carbon fibers, long enough to contact and overlap each other, will result in a floor or counter surface sufficiently conductive to overcome the highly electrical insulating nature of the thermoset resins used in such floor or counter laminates.

These laminates will generally have antistatic properties through the top portion, i.e., at least ⅛ of their thickness, and preferably throughout their entire thickness, and do not rely on either a surface treatment or a highly conductive, extra bottom backing layer for static reduction. Since only from about 1 wt. % to about 15 wt. % carbon fibers are used, based on total unimpregnated paper and carbon fiber weight, costs are kept down, and the product at maximum carbon loading is medium grey, rather than black, with a random pattern which is attractive and is an acceptable decorative pattern. This eliminates the need for major amounts of colored pigment to tone down or modify the black surface resulting when high, spherical carbon particle loadings are used to provide contacting, static-dissipating laminate layers. In addition, these laminates wear well, can be applied in large area sheet form, are thin, inexpensive, and allow ease of manufacture.

BRIEF DESCRIPTION OF THE DRAWING

For a better understanding of the invention, reference may be made to one embodiment exemplary of the invention, shown in the accompanying drawings, in which.

DESCRIPTION OF THE PREFERRED EMBODIMENTS

Figure 1:
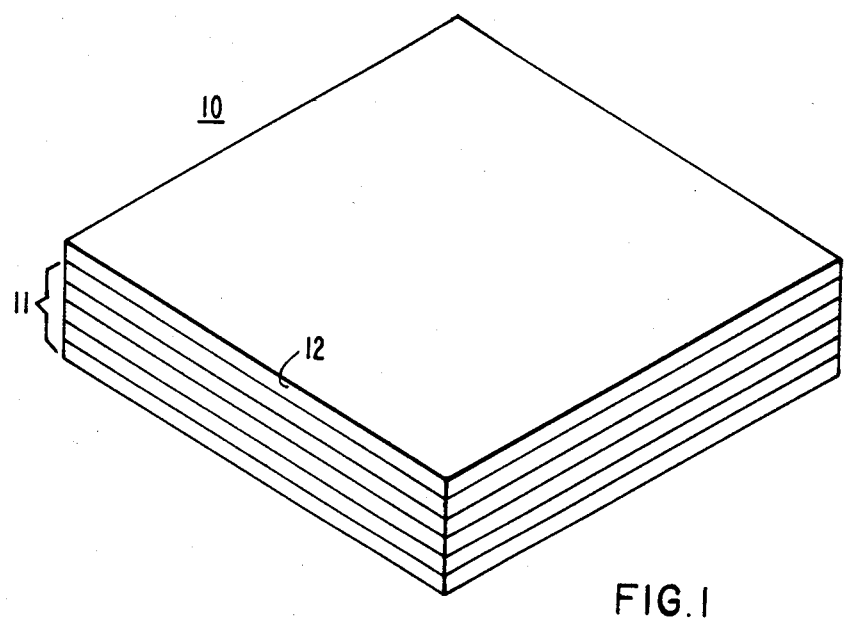
FIG. 1 shows a decorative static-dissipating surfacing laminate.

Referring now to FIG. 1 of the drawings, a laminate 10 comprises a lay-up of a plurality of resin impregnated core sheets 11, and a superimposed resin impregnated decorative print sheet 12, which also serves as a protective sheet. Heat and pressure are applied to this lay-up to consolidate the materials into a unitary decorative structure.

The print sheet 12 usually provides the decorative effect for the laminate. It is usually in the form of a decorative sheet, i.e. dyed, or pigmented to impart a solid color. It usually comprises a single fibrous sheet of high grade, absorbent, alpha-cellulose or regenerated cellulose paper impregnated with a thermosetting resin, such as a melamine-formaldehyde resin or other aminotriazine-aldehyde resin.

The rigidity-imparting core stock layer is made of a plurality of fibrous sheets of Kraft paper, rag paper, cotton linter fiber paper, Dacron (polyethylene terephthalate) cloth, cotton cloth, glass cloth or the like, containing epoxy resin, or phenolic resin, such as a phenol-formaldehyde resin. Typically, 2 to 6 core sheets are consolidated with a single print sheet to form a conventional 0.16 cm. (1/16 in.) thick decorative laminate.

High pressure laminating techniques are employed in preparing the laminates from the above described assembly of core stock layer of core sheets, and print overlay sheet. Temperatures ranging from about 120° C. to about 175° C. and pressures ranging from about 600 psi. to 2,000 psi. are employed. The time required, at these temperatures, to effect a cure of the resinous components of the assembly will usually be from about 3 minutes to about 25 minutes. The resulting laminate is generally allowed to cool to from about 50° C. to 85° C. before being removed from the press. The cooling step generally takes from about 30 minutes to 90 minutes. Generally, the assembly will require a 15 minute to 45 minute warm up period before the 120° C. to 175° C. maximum curing temperatures are reached in the press. The entire cycle of warm up, cure and cooling will vary from 50 minutes to 160 minutes.

The aminotriazine-aldehyde resins used to impregnate the print sheet is well known in the art, and reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430. Epoxy resins are also well known in the art.

In the static-dissipating, heat and pressure consolidated laminate of this invention, thin carbon fibers, having lengths of from about 0.20 inch to about 0.75 inch, preferably from about 0.25 inch to about 0.50 inch are uniformly distributed throughout the fibrous print layer, and preferably also throughout the fibrous core layer of the laminate. The diameter of the carbon fibers will generally range from about 0.3 mil to about 3.0 mils. The carbon fibers are readily commercially available. The carbon fibers will be present in the print layer, and when used in the core, in an amount of from about 1 wt. % to about 15 wt. %, preferably from about 3 wt. % to about 8 wt. %, based on total unimpregnated, resin free sheet weight plus carbon fiber weight. Use of carbon fibers within the 1 wt. % to 15 wt. % range provides an amount of carbon fiber contact effective to provide an antistatic effect, so that static charges accumulating on the top of the decorative layer are dissipated.

Preferably, the carbon fibers will be blended into the wood pulp, i.e., "felted into" the print or core sheets during paper manufacture, in an amount that will correspond to between the 1 wt. % and 15 wt. % values before described. Seldom can the carbon fibers be mixed onto the impregnating resins, or mixed into a resin surface coating for the paper with good results. When used in the resin, the carbon fibers would not easily remain suspended, would be badly broken during mixing, and would have difficulty being impregnated into the centers of the sheets, not achieving a uniform distribution throughout the sheets.

Carbon fibers over about 0.75 inch long are not easily obtainable, provide no advantage in reducing resistivity and would add to paper felting difficulties. Carbon fibers less than about 0.20 inch long do not provide the required interconnection and contact required to lower resistivity substantially unless used in major amounts, increasing costs and providing a black surfaced material which may not be esthetically desirable in most commercial applications. In any case, carbon particles, i.e., spheres, are not desirable in the tip print overlay surface layer, since too high a loading is required for good anti-static contact, and at high loadings they would provide a black surfaced material. Carbon fiber content over about 15 wt. % adds significantly to expense, provides a much blacker surfaced material not esthetically pleasing, and doesn't improve anti-static properties significantly. Carbon fiber content under about 1 wt. % will not provide enough fiber to fiber contact even if the fibers are relatively long to give effective anti-static properties to the laminate and eliminate charge accumulations at the top decorative surface.

Figure 2:
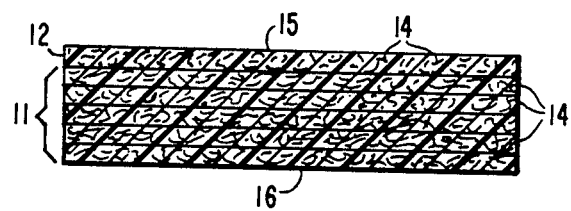
FIG. 2 shows a cross-sectional view of the laminate detailing the uniform distribution of long carbon fibers throughout its cross-section.

In the most preferred embodiment, shown in FIG. 2 of the drawings, the intermingled, interconnecting, contacting carbon fibers 14 will be uniformly distributed throughout, preferably felted into the print layer 12, and core layer 11, to provide maximum reduction in volume resistivity. The distribution must be uniform and in an amount effective so that good electrical contact is assured, to provide electric static drain from the top surface 15 of the overlay layer and laminate. While not clearly shown in FIG. 2 for the sake of simplicity, the carbon fibers of each sheet are also in generally contacting relationship, providing a conductive path from top surface 15 to bottom surface 16 of the laminate.

In some instances, where a thin laminate is used, and where surface resistivity reduction is primarily desired, only the print layer 12 need contain the uniform distribution of the carbon fibers. In all instances, the laminate will be electrically conductive into its interior. As shown in FIG. 2, no backing layer is used or desired next to the core layer 11, at bottom surface 16, to provide or enhance conductivity.

In all cases, the standard ASTM-D257-54T surface resistivity will be at or below about $1 \times 10^6$ megohms, and when the carbon fibers are included in the laminate core, the standard ASTM-D257-54T volume resistivity will be at or below about $1 \times 10^5$ megohms/cm. These laminates, can be used alone as a surfacing material, and can be easily applied in large sheet form to wood, concrete, or plaster, to provide superior, inexpensive, attractive, antistatic surfaces for computer room or hospital floors, walls, counters, and the like.

EXAMPLE

Long sections of 66 lb. (per 3,000 sq. ft.) basis weight, alpha cellulose paper stock, containing 1.2 wt. %, 5 wt. %, and 10 wt. % respectively of intermingled, contacting carbon fibers, about 1.5 mils in diameter and from 0.25 inch to 0.44 inch long, were impregnated with melamine-formaldehyde resin. Another long section of these carbon fiber containing paper stocks were impregnated with phenol-formaldehyde resin. Control sections of stock containing 100 wt. % paper fibers, i.e., no carbon fibers, inpregnated with melamine-formaldehyde and phenol-formaldehyde resin were also made. The sections were all cut into 5 ft. × 12 ft. sheets.

Twelve stack-ups, each containing one melamine impregnated sheet with carbon fibers, and six phenolic impregnated sheets, as a core, with carbon fibers, were assembled, Samples A, B and C, appropriately placed between press plates and heated platens in a flat bed press, and molded, using a 60 minute heating plus cooling cycle, with peak platen temperature of about 132° C., and a pressure of about 1200 psi. Additionally, in a similar construction and fashion, twelve stack-ups, using only a top melamine impregnated sheet with carbon fibers, Sample D, and control sheets with no carbon fibers, Control Sample E, were molded, where, however, the Sample D core sheets were 156 lb. basis weight Kraft paper. After cooling and press release, the resulting laminates were tested for surface and volume resistivity by the standard ASTM-D257-54T method. The results are shown in Table 1 below, where lower megohm values mean better laminate antistatic properties:

TABLE 1

| Sample | Carbon Fibers | Surface Resistivity | Volume Resistivity |
|---|---|---|---|
| A. 1 melamine top sheet | 1.2 wt. % | $4.8 \times 10^5$ megohms | $1.8 \times 10^4 \frac{\text{megohms}}{\text{cm.}}$ |
| 6 phenolic core sheets | 1.2 wt. % | | |
| B. 1 melamine top sheet | 5 wt. % | $1.3 \times 10^5$ megohms | $0.9 \times 10^4 \frac{\text{megohms}}{\text{cm.}}$ |
| 6 phenolic core sheets | 5 wt. % | | |
| C. 1 melamine top sheet | 10 wt. % | $6 \times 10^4$ megohms | $6 \times 10^3 \frac{\text{megohms}}{\text{cm.}}$ |
| 6 phenolic core sheets | 10 wt. % | | |
| D. 1 melamine top sheet | 10 wt. % | $1 \times 10^5$ megohms | $1 \times 10^9 \frac{\text{megohms}}{\text{cm.}}$ |
| 6 phenolic core sheets | 0 wt. % | | |
| E.* 1 melamine top sheet | 0 wt. % | $1 \times 10^8$ megohms | $1 \times 10^9 \frac{\text{megohms}}{\text{cm.}}$ |
| 6 phenolic core sheets | 0 wt. % | | |

*Comparative control sample
Core and top sheets are alpha cellulose in Samples A to C & E, with Sample D having alpha cellulose top and Kraft core sheets As can be seen, even the use of the carbon fibers only in the top sheet of a seven sheet laminate dropped surface resistivity by a factor of $10^3$ megohms from the control sample. Use of carbon fibers throughout the laminate, in the best sample, dropped surface resistivity by a factor of over $10^4$ megohms, and more importantly, dropped volume resistivity by a factor of over $10^6$ megohms from the control sample.

I claim:

1. A static-dissipating, heat and pressure consolidated laminate comprising:
   (A) a bottom core layer containing a plurality of fibrous sheets, and
   (B) a top decorative fibrous layer disposed on the core layer, where the core and decorative layers are impregnated throughout with a cured resin and where at least the decorative layer has contacting, carbon fibers uniformly distributed therethrough, the carbon fibers constituting from about 1 wt. % to about 15 wt. % of the unimpregnated, non-carbon decorative fiber weight plus carbon fiber weight in the decorative layer, said carbon fibers being effective to dissipate static charges accumulating on the top of the decorative layer, where the cured resin remains impregnated in the laminate after heat and pressure consolidation without being carbonized.

2. The static-dissipating laminate of claim 1, where the resin impregnating the layers is a thermosetting resin, the carbon fibers are from about 0.20 inch to about 0.75 inch long, and no additional conductive layer is attached to the bottom of the core layer.

3. The static-dissipating laminate of claim 1, where the carbon fibers in the decorative layer are felted into the decorative layer, the bottom core layer comprises sheets selected from the group consisting of Kraft paper, rag paper, cotton linter paper, polyethylene therephthalate cloth, cotton cloth, and glass cloth, the top decorative fibrous layer comprises cellulose paper, the top decorative layer is disposed directly on the core layer, the impregnated resin is heated at a temperature ranging from about 120° C. to about 175° C. during laminate consolidation, the impregnating resin for the decorative layer is a melamine aldehyde resin, and the impregnating resin for the core is a phenol-aldehyde resin.

4. A static-dissipating, electrically conducting, heat and pressure consolidated decorative laminate comprising:
   (A) a bottom core layer containning a plurality of fibrous sheets, and
   (B) a top decorative fibrous layer disposed on the core layer, where the core and decorative layers comprise fibrous sheet material which is impregnated throughout with a cured resin and where both layers have contacting, carbon fibers uniformly distributed therethrough, the carbon fibers in the core layer constituting from about 1 wt. % to about 15 wt. % of the unimpregnated, non-carbon core fiber weight plus carbon fiber weight, and the carbon fibers in the decorative layer constituting from about 1 wt. % to about 15 wt. % of the unimpregnated, non-carbon decorative fiber weight plus carbon fiber weight, said carbon fibers being effective to provide a static-dissipating, electrically conducting decorative laminate, so that static charges accumulating on the top of the decorative layer are dissipated, where the cured resin remains impregnated in the laminate after heat and pressure consolidation without being carbonized.

5. The static dissipating, electrically conducting laminate of claim 4, where the resin impregnating the fibrous sheet material is a thermosetting resin, and the carbon fibers are from about 0.20 inch to about 0.75 inch long.

6. The static-dissipating, electrically conducting laminate of claim 4, where the carbon fibers in the core and decorative layer are felted into the core and decorative layer, the bottom core layer comprises sheets selected from the group consisting of Kraft paper, rag paper, cotton linter paper, polyethylene terephthalate cloth, cotton cloth, and glass cloth, the top decorative fibrous layer comprises cellulose paper, the top decorative layer is disposed directly on the core layer, and the impregnated resin is heated at a temperature ranging from about 120° C. to about 170° C. during laminate consolidation.

7. The static-dissipating, electrically conducting laminate of claim 4, where no additional conductive layer is attached to the bottom of the core layer.

8. The static-dissipating, electrically conducting laminate of claim 4, where the impregnating resin for the decorative layer is a melamine aldehyde resin, the impregnating resin for the core is a phenol-aldehyde resin, the carbon fibers form a conductive path from the top to the bottom of the laminate, and the surface resistivity of the laminate is at or below $1 \times 10^6$ megohms, and the volume resistivity of the laminate is at or below $1 \times 10^5$ megohms.

* * * * *